(12) United States Patent  
Zhang et al.

(10) Patent No.: US 12,335,423 B2  
(45) Date of Patent: Jun. 17, 2025

(54) MOBILE TERMINAL

(71) Applicant: HUAWEI TECHNOLOGIES CO., LTD., Shenzhen (CN)

(72) Inventors: Cheng Zhang, Shenzhen (CN); Wenhao Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 403 days.

(21) Appl. No.: 17/802,419

(22) PCT Filed: Mar. 12, 2021

(86) PCT No.: PCT/CN2021/080487  
§ 371 (c)(1),  
(2) Date: Aug. 25, 2022

(87) PCT Pub. No.: WO2021/185173  
PCT Pub. Date: Sep. 23, 2021

(65) Prior Publication Data  
US 2023/0079983 A1 Mar. 16, 2023

(30) Foreign Application Priority Data  
Mar. 16, 2020 (CN) .......................... 202010181703.4

(51) Int. Cl.  
*H04M 1/00* (2006.01)  
*G06F 1/16* (2006.01)  
*H04M 1/02* (2006.01)

(52) U.S. Cl.  
CPC ........ *H04M 1/0266* (2013.01); *G06F 1/1656* (2013.01); *H04M 2201/08* (2013.01)

(58) Field of Classification Search  
CPC .......... H04M 1/0266; H04M 2201/08; H04M 1/026; G06F 1/1656; H04R 7/04;  
(Continued)

(56) References Cited

U.S. PATENT DOCUMENTS 8,199,960 B2 * 6/2012 Eaton .................... G06F 1/1613  
                                                                          381/388  
8,242,641 B2 * 8/2012 Bae ........................ H02P 25/034  
                                                                          310/15  
(Continued)

FOREIGN PATENT DOCUMENTS

CN         202663535 U     1/2013  
CN         107295446 A     10/2017  
(Continued)

*Primary Examiner* — Amancio Gonzalez  
(74) *Attorney, Agent, or Firm* — Rimon PC

(57) ABSTRACT

Embodiments of this application provide a mobile terminal, relate to the field of sound on screen technologies. At least a part of a vibrator in the mobile terminal is disposed in an accommodation cavity. The vibrator includes a first magnet, a second magnet, a coil, and at least one third magnet. The first magnet, the coil, and the third magnet are all connected to a rear face of a display module. The first magnet is located in a closed region enclosed by a conducting wire of the coil. The third magnet is located on one side that is of the coil and that is away from the first magnet. The second magnet is connected to a middle frame, and a location of the second magnet and a location of the first magnet are disposed opposite each other.

15 Claims, 13 Drawing Sheets

(58) Field of Classification Search
CPC ............... H04R 9/025; H04R 2499/11; H04R 2499/15; H04R 9/02; H04R 9/04
USPC ........................................................ 455/566
See application file for complete search history.

(56) References Cited

U.S. PATENT DOCUMENTS

| | | | |
|---|---|---|---|
| 9,219,401 B2* | 12/2015 | Kim | H02K 33/16 |
| 9,872,110 B2* | 1/2018 | Fukami | B06B 1/0253 |
| 11,476,899 B2* | 10/2022 | Ma | H04B 7/0413 |
| 2009/0097691 A1 | 4/2009 | Eaton | |
| 2013/0182878 A1* | 7/2013 | Liu | H04R 7/045 |
| | | | 381/333 |
| 2018/0084347 A1 | 3/2018 | Fukami et al. | |
| 2021/0311332 A1* | 10/2021 | Lee | G02C 7/083 |

FOREIGN PATENT DOCUMENTS

| | | |
|---|---|---|
| CN | 209057357 U | 7/2019 |
| CN | 110381425 A | 10/2019 |
| CN | 110572749 A | 12/2019 |
| CN | 209767592 U | 12/2019 |
| CN | 210041904 U | 2/2020 |
| CN | 210093431 U | 2/2020 |
| CN | 210093519 U | 2/2020 |
| KR | 20190048929 A | 5/2019 |
| WO | 2019081805 A1 | 5/2019 |

* cited by examiner

MOBILE TERMINAL

CROSS-REFERENCE TO RELATED APPLICATIONS

This application is a National Stage of International Application No. PCT/CN2021/080487, filed on Mar. 12, 2021, which claims priority to Chinese Patent Application No. 202010181703.4, filed on Mar. 16, 2020. Both of the aforementioned applications are hereby incorporated by reference in their entireties.

TECHNICAL FIELD

This application relates to the field of sound on screen technologies, and in particular, to a mobile terminal.

BACKGROUND

A user has a higher requirement for a screen-to-body ratio of a mobile terminal, for example, a mobile phone. To increase the screen-to-body ratio of the entire mobile phone, a vibrator may be disposed on a rear face of a display of the mobile phone. The vibrator provides a driving force to the display, to drive the display to vibrate. In this case, the display may be used as a diaphragm, and in a vibration process, air is pushed to produce a sound, to make a sound on screen. Therefore, there is no need to punch a hole or install an earpiece on a front face of the mobile phone, to increase the screen-to-body ratio of the mobile phone.

The vibrator is provided with a coil for generating the driving force. To meet a requirement for the driving force, the coil needs to have a large quantity of turns. However, a quantity of turns of the coil is directly proportional to impedance of the coil, and the impedance of the coil further increases with an increase in a sound making frequency when the sound making frequency is a high frequency. Therefore, when a sound on screen is made on a high frequency band, a current on the coil decreases due to an increase in the impedance. Consequently, a driving force provided by the vibrator to a screen is insufficient, and a high frequency volume of a sound made by the mobile phone is insufficient.

SUMMARY

Embodiments of this application provide a mobile terminal, to resolve a problem that there is an insufficient volume on a high frequency band when the mobile terminal makes a sound on screen.

To achieve the foregoing objective, the following technical solutions are used in this application.

An aspect of embodiments of this application provides a mobile terminal, including a middle frame, a display module, and at least one vibrator. The display module is connected to the middle frame, and an accommodation cavity is formed between the display module and the middle frame. At least a part of the vibrator is disposed inside the accommodation cavity. The vibrator includes a first magnet, a second magnet, a coil, and at least one third magnet. In a direction perpendicular to a display surface of the display module, the vibrator is configured to drive the display module to vibrate upwards and downwards. The first magnet, the coil, and the third magnet are all connected to a rear face of the display module. The first magnet is located in a closed region enclosed by a conducting wire of the coil. The third magnet is located on one side that is of the coil and that is away from the first magnet. The second magnet is connected to the middle frame, and a location of the second magnet and a location of the first magnet are disposed opposite each other. A first pole of the first magnet, a first pole of the second magnet, and a second pole of the third magnet are close to each other, so that at least some magnetic lines of force pass through the coil from a surface that is of the coil and that is close to the first magnet and a surface that is of the coil and that is close to the third magnet. Therefore, a third magnet located outside the coil is added to the vibrator, and a magnetization direction of the third magnet is set, in other words, the first pole of the first magnet, the first pole of the second magnet, and the second pole of the third magnet are close to each other, to forcibly specify a path and a direction of a magnetic line of force in space in which a magnet is located. In addition, because the at least some magnetic lines of force may pass through the coil from the surface that is of the coil and that is close to the first magnet and the surface that is of the coil and that is close to the third magnet, directions of most of magnetic lines of force entering the coil approximate to a horizontal direction. A component that is in the horizontal direction and that is of the magnetic lines of force entering the coil can drive the coil to vibrate in a vertical direction (the direction perpendicular to the display surface of the display module) in a magnetic field. Therefore, when the directions of most of the magnetic lines of force entering the coil approximate to the horizontal direction, the component that is in the horizontal direction and that is of the magnetic lines of force entering the coil increases. Therefore, a driving force that is of the coil and that is used to drive the display module to vibrate in the vertical direction can be increased. Therefore, when the vibrator provided in this embodiment of this application is used to drive the display module to make a sound on screen, a quantity of turns of the coil may be appropriately reduced when the driving force provided by the vibrator remains unchanged, to reduce impedance of the coil. Therefore, when a sound on screen is made on a high frequency band, a current on the coil does not decrease due to an increase in the impedance, to effectively resolve a problem that a high frequency volume of the mobile terminal is insufficient. In addition, when the quantity of turns of the coil is reduced, a size of the coil is also reduced, to help reduce a dimension of the vibrator. In addition, because the component that is in the horizontal direction and that is of the magnetic lines of force entering the coil increases, a component that is in the vertical direction and that is of the magnetic lines of force entering the coil decreases. Therefore, a vibration amplitude of the coil in the horizontal direction can be reduced, and a shear force between the coil and the display module can be reduced. Further, when the coil and the display module are bound and fastened by using an adhesive layer, a problem that degumming of the coil occurs due to the shear force in a vibration process, and consequently, product reliability is reduced may be avoided.

Optionally, a magnetization direction of the third magnet is perpendicular to the display surface of the display module. A first pole of the third magnet is close to the display module, and the second pole of the third magnet is away from the display module. In this case, outside the second magnet, after passing through the coil from the first pole of the second magnet, the magnetic line of force may enter the second pole that is of the third magnet and that is closest to the first pole of the second magnet. In addition, the third magnet is disposed on one side that is of the coil and that is away from the first magnet, the third magnet and the coil are disposed in parallel, and the coil protrudes from the first magnet on one side close to the middle frame in the direction perpendicular to the display surface of the display module. Therefore, a surface that is of the coil and that is close to the first magnet is not blocked by the first magnet, so that outside the second magnet, after departing from the first pole of the second magnet, the magnetic line of force enters the coil from a part that is of the coil, that is close to the first magnet, and that is not blocked by the first magnet. Therefore, the directions of most of the magnetic lines of force entering the coil approximate to the horizontal direction.

Optionally, a magnetization direction of the third magnet is parallel to the display surface of the display module. The second pole of the third magnet is close to the first magnet, and a first pole of the third magnet is away from the first magnet. Similarly, outside the second magnet, after passing through the coil from the first pole of the second magnet, the magnetic line of force enters the second pole that is of the third magnet and that is closest to the first pole of the second magnet. Therefore, the directions of most of the magnetic lines of force entering the coil approximate to the horizontal direction.

Optionally, the vibrator further includes a magnetic conductive sheet. The magnetic conductive sheet is disposed on a surface of one side on which the first pole of the first magnet is located, and a magnetic conduction direction of the magnetic conductive sheet is parallel to the display surface of the display module. Under a magnetic conduction action of the magnetic conductive sheet, outside the second magnet, after departing from the first pole of the second magnet, the magnetic line of force enters the magnetic conductive sheet, travels in the horizontal direction, and enters the coil. Therefore, a quantity of magnetic lines of force approaching the horizontal direction in the coil can be increased.

Optionally, the vibrator includes a plurality of third magnets distributed around the coil. Two adjacent third magnets are connected by using an adhesive layer. Therefore, the plurality of third magnets may be connected by using an adhesive, and robustness of the plurality of third magnets may be enhanced. In addition, each independent third magnet may be more easily processed.

Optionally, a cross section of the third magnet is in a fan shape. A radian of a surface of one side that is of the third magnet and that is close to the coil coincides with a radian of an outer surface of the coil. The cross section is parallel to the display surface of the display module. Therefore, component space inside the vibrator is increased, and dimension interference between adjacent components is reduced. In addition, when the third magnet and the coil are bound by using an adhesive, the third magnet and the coil can be bound more closely.

Optionally, a cross section of the third magnet is in an annular shape. Both the coil and the first magnet are located in the annular shape. A radian of a surface of one side that is of the third magnet and that is close to the coil coincides with a radian of an outer surface of the coil. The cross section is parallel to the display surface of the display module. In this case, a periphery of the first magnet may be enclosed by the third magnet, and strength of a magnetic field provided by the third magnet may be increased.

Optionally, the vibrator further includes at least one fourth magnet. The fourth magnet is connected to the middle frame. A magnetization direction of the fourth magnet is parallel to the display surface of the display module and faces an inside of the vibrator. Therefore, strength of a magnetic field inside the vibrator may be further increased, and a quantity of magnetic lines of force entering the coil can be further increased, to increase the driving force applied by the coil to the display module.

Optionally, the vibrator includes a plurality of fourth magnets distributed around the second magnet. Two adjacent fourth magnets are connected by using an adhesive layer. Therefore, the plurality of fourth magnets may be connected by using an adhesive, and robustness of the plurality of fourth magnets may be enhanced. In addition, each independent fourth magnet may be more easily processed.

Optionally, a cross section of the second magnet is in a circular shape. A cross section of the fourth magnet is in a fan shape. A radian of a surface of one side that is of the fourth magnet and that is close to the second magnet coincides with a radian of a surface of one side that is of the second magnet and that is close to the fourth magnet. The cross section is parallel to the display surface of the display module. Therefore, installation of the fourth magnet can be facilitated, and a probability of dimension interference between components in the vibrator can be reduced.

Optionally, a cross section of the second magnet is in a circular shape. A cross section of the fourth magnet is in an annular shape. The second magnet is located in the annular shape. A radian of a surface of one side that is of the fourth magnet and that is close to the second magnet coincides with a radian of a surface of one side that is of the second magnet and that is close to the fourth magnet. The cross section is parallel to the display surface of the display module. In this case, a periphery of the second magnet may be enclosed by the fourth magnet, and strength of a magnetic field provided by the fourth magnet may be increased.

Optionally, the middle frame is provided with an opening. The mobile terminal further includes a support. At least a part of the second magnet is located in the opening on the middle frame. The support is disposed on a surface of one side that is of the middle frame and that is away from the display module, and is connected to the middle frame. The second magnet passes through the opening and is disposed on the support. Therefore, when a dimension of a gap H between a bearing plate of the middle frame and the rear face of the display module is limited, the vibrator may be disposed on the support on the side that is of the middle frame and that is away from the display module, so that a part of the vibrator is located in the accommodation cavity formed between the middle frame and the display module, to help reduce a thickness of the mobile terminal.

Optionally, the mobile terminal further includes a first magnetic insulation cover and a second magnetic insulation cover. The first magnetic insulation cover is connected to the rear face of the display module. The first magnet, the third magnet, and the coil are all located in the first magnetic insulation cover, and are all connected to an inner wall of the first magnetic insulation cover. The first magnetic insulation cover is configured to carry the first magnet, the third magnet, and the coil. The second magnetic insulation cover is connected to the middle frame. The second magnet is located in the second magnetic insulation cover, and is connected to an inner wall of the second magnetic insulation cover. The second magnetic insulation cover is configured to carry the second magnet. In addition, the first magnetic insulation cover and the second magnetic insulation cover may be made of a magnetic conductive material, to reduce diffusion of magnetic lines of force in a magnetic field including the first magnet, the second magnet, the coil, and the third magnet, and reduce magnetic resistance.

Optionally, when the vibrator includes the fourth magnet, the fourth magnet is located in the second magnetic insulation cover and is connected to the inner wall of the second magnetic insulation cover. The fourth magnet may be disposed in the second magnetic insulation cover, and the second magnetic insulation cover can be used to reduce diffusion of magnetic lines of force in the magnetic field of the fourth magnet.

Optionally, the mobile terminal further includes a support sheet. An upper surface of the support sheet is connected to the display module. A lower surface of the support sheet is connected to the first magnetic insulation cover. An area of the upper surface of the support sheet is greater than an area of a surface of one side that is of the first magnetic insulation cover and that is close to the support sheet. Therefore, a contact area between the support sheet and the display module is large because the support sheet is of a sheet structure. Therefore, the upper surface and the lower surface of the support sheet are respectively in contact with the display module and the vibrator, to increase a contact area between the vibrator and the display module, so that the driving force provided by the vibrator to the display module can be applied to the display module more evenly in a vibration process. In addition, the support sheet may be used to further enlarge an area of a deformation region of the display module, increase efficiency of driving, by the vibrator, the display module to vibrate, reduce power consumption, and improve an effect of making a sound on screen.

BRIEF DESCRIPTION OF DRAWINGS

FIG. 1b is a schematic diagram of a structure of a display module in FIG. 1a;

FIG. 1c is a schematic diagram of another structure of a display module in FIG. 1a;

FIG. 3b is a schematic diagram of a structure of a coil and a first magnet in FIG. 3a;

FIG. 5b is a schematic diagram of a magnetic field distribution of the vibrator in FIG. 5a;

FIG. 6b is a schematic diagram of another magnetic field distribution of the vibrator in FIG. 6a;

FIG. 6c is a schematic diagram of another magnetic field distribution of the vibrator in FIG. 6a;

FIG. 7a is a schematic diagram of a structure of a coil and a third magnet in FIG. 5a;

FIG. 7b is a schematic diagram of another structure of a coil and a third magnet in FIG. 5a;

FIG. 12b is a schematic diagram of a magnetic field distribution of the vibrator in FIG. 12a;

FIG. 13b is a schematic diagram of a magnetic field distribution of the vibrator in FIG. 13a;

REFERENCE NUMERALS

01: Mobile terminal; 10: Display module; 11: Middle frame; 110: Frame; 111: Bearing plate; 12: Housing; 101: Display; 102: BLU; 103: Accommodation cavity; 20: Vibrator; 200: Coil; 201: First magnet; 202: Second magnet; 203: Third magnet; 30: Support; 31: Opening; 41: First magnetic insulation cover; 42: Second magnetic insulation cover; 204: Fourth magnet; 50: Support sheet; and 300: Magnetic conductive sheet.

DESCRIPTION OF EMBODIMENTS

The following describes the technical solutions in embodiments of this application with reference to the accompanying drawings in embodiments of this application. It is clear that the described embodiments are merely a part rather than all of embodiments of this application.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the descriptions of this application, unless otherwise stated, "a plurality of" means two or more than two.

In addition, in this application, directional terms such as "up", "down", "left", and "right" may be defined relative to a direction including but not limited to an example direction in which a component in the accompanying drawings is placed. It should be understood that these directional terms may be relative concepts. The directional terms are used for relative description and clarification, and may correspondingly vary with the direction in which the component in the accompanying drawings is placed.

In this application, the term "connection" should be understood in a broad sense unless otherwise expressly specified and limited. For example, "connection" may be a fixed connection, may be a detachable connection or an integrated connection, may be a direct connection, or may be an indirect connection based on an intermediate medium.

An embodiment of this application provides a mobile terminal. The mobile terminal includes an electronic product that can be used to make a call and perform display in a handheld mode, for example, a mobile phone, a tablet computer, or a smart watch. A specific form of the mobile terminal is not specifically limited in this embodiment of this application. For ease of description, the following provides descriptions by using an example in which the mobile terminal is a mobile phone shown in FIG. 1a.

Figure 1A:
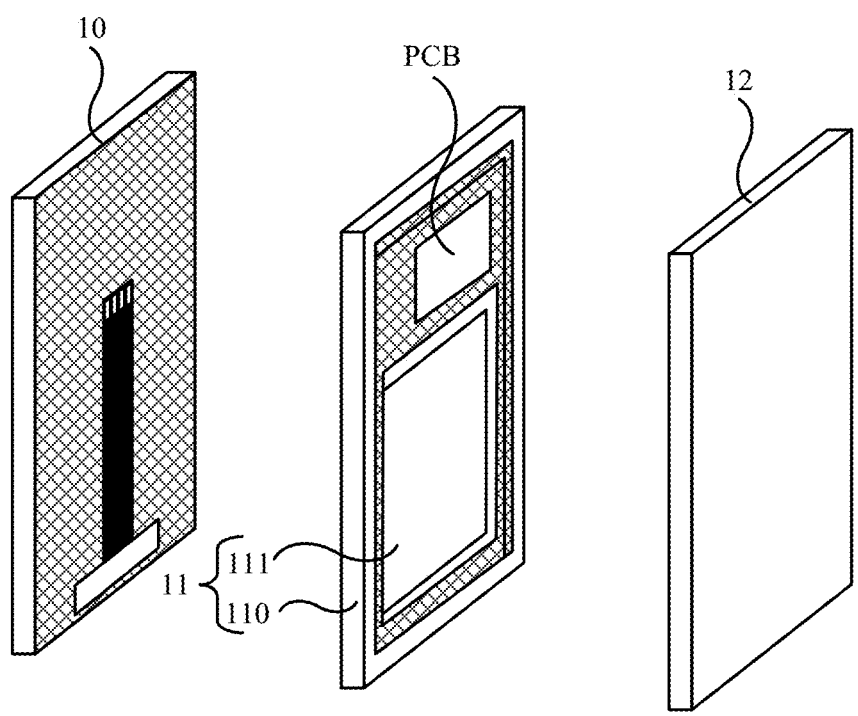
FIG. 1a is a schematic diagram of a structure of a mobile terminal according to an embodiment of this application.
Figure 1B:
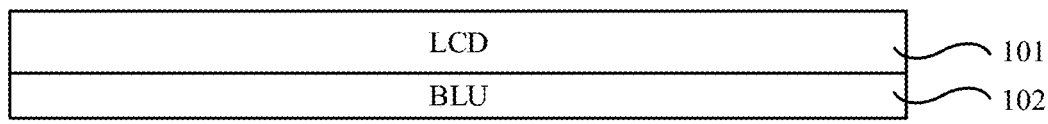

As shown in FIG. 1a, the mobile terminal 01 mainly includes but is not limited to a display module 10. The display module 10 may include a display (display panel, DP). In some embodiments of this application, as shown in FIG. 1b, a display 101 may be a liquid crystal display (liquid crystal display, LCD). In this case, as shown in FIG. 1b, the display module 10 further includes a backlight unit (backlight unit, BLU) 102 for providing a light source to the LCD. The LCD may be a hard display.

Figure 1C:
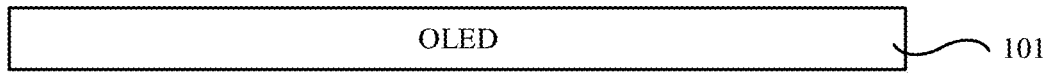

Alternatively, in some other embodiments of this application, as shown in FIG. 1c, a display 101 may be an organic light-emitting diode (organic light emitting diode, OLED) display. The OLED display can be self-luminous. Therefore, the BLU 102 does not need to be disposed in the display module 10. The OLED display may be a hard display. Alternatively, when a substrate of the OLED display is a flexible substrate, the OLED display may be a flexible display.

In addition, the mobile terminal 01 further includes a middle frame 11 and a housing 12 shown in FIG. 1a. The display module 10 and the housing 12 are respectively located on two sides of the middle frame 11. The middle frame 11 includes a bearing plate 111 parallel to or approximately parallel to the display module 10, and a frame 110 disposed around the bearing plate 111. An internal component such as a battery, a printed circuit board (printed circuit board, PCB), a camera (Camera), or an antenna is disposed on a surface of one side of that is of the bearing plate 111 and that is close to the housing 12.

Figure 2:
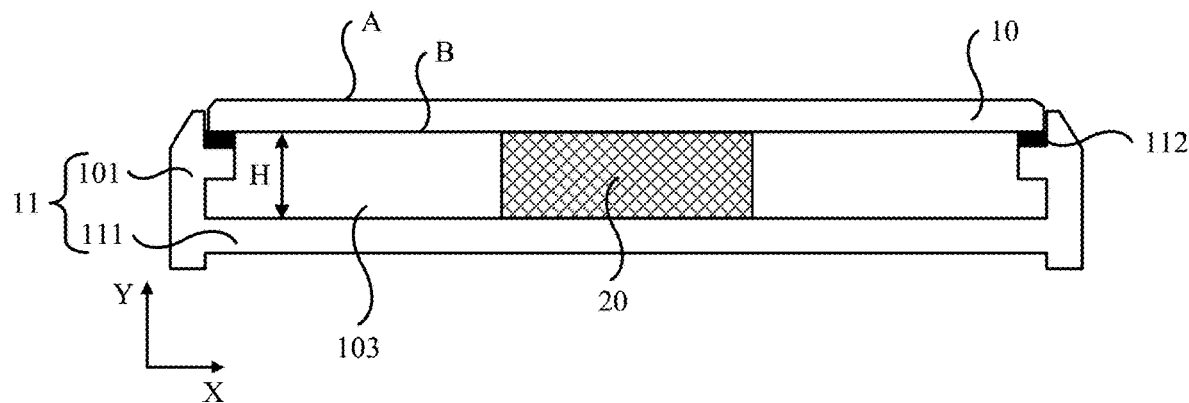
FIG. 2 is a schematic diagram of a structure of a mobile terminal including a vibrator according to an embodiment of this application.

As shown in FIG. 2, one side that is of the middle frame 11 and that is close to the display module 10 may be connected to the display module 10 by using a foam adhesive 112. There is a gap H between the bearing plate 111 of the middle frame 11 and a rear face B of the display module 10 (a surface opposite to a display surface A of the display module 10), so that an accommodation cavity 103 is formed between the display module 10 and the middle frame 11. To make a sound on screen, the mobile terminal 01 further includes at least one vibrator 20 shown in FIG. 2. At least a part of the vibrator 20 is disposed in the accommodation cavity 103. In a direction perpendicular to the display surface A of the display module 10 (namely, a direction Y in FIG. 2), the vibrator 20 is configured to drive the display module 10 to vibrate upwards and downwards.

The following provides, by using a specific example, example descriptions of a structure of the vibrator 20 and a manner of disposing at least a part of the vibrator 20 in the accommodation cavity 103.

Example 1

Figure 3A:
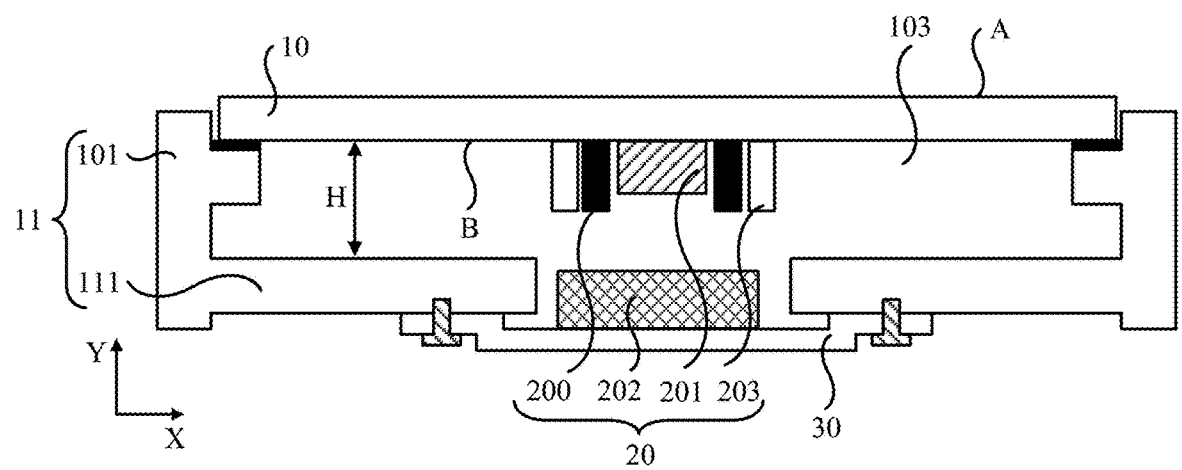
FIG. 3a is a schematic diagram of a structure of another mobile terminal including a vibrator according to an embodiment of this application.

In this example, when a dimension of the gap H between the bearing plate 111 of the middle frame 11 and the rear face B of the display module 10 is limited, as shown in FIG. 3a, at least a part of the vibrator 20 may be disposed in the accommodation cavity 103.

Figure 3B:
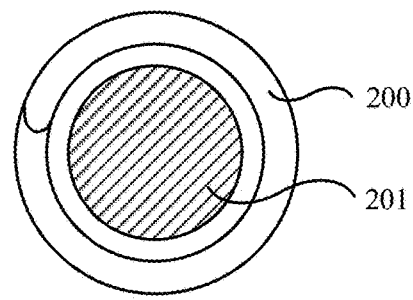

The vibrator 20 may include a first magnet 201, a second magnet 202, a coil 200, and at least one third magnet 203 shown in FIG. 3a. The first magnet 201, the coil 200, and the third magnet 203 are all connected to the rear face B of the display module 10. As shown in FIG. 3b, the first magnet 201 may be located in a closed region enclosed by a conducting wire of the coil 200. In addition, as shown in FIG. 3a, the second magnet 202 is connected to the bearing plate 111 of the middle frame 11. In addition, a location of the second magnet 202 and a location of the first magnet 201 are disposed opposite each other.

Figure 4:
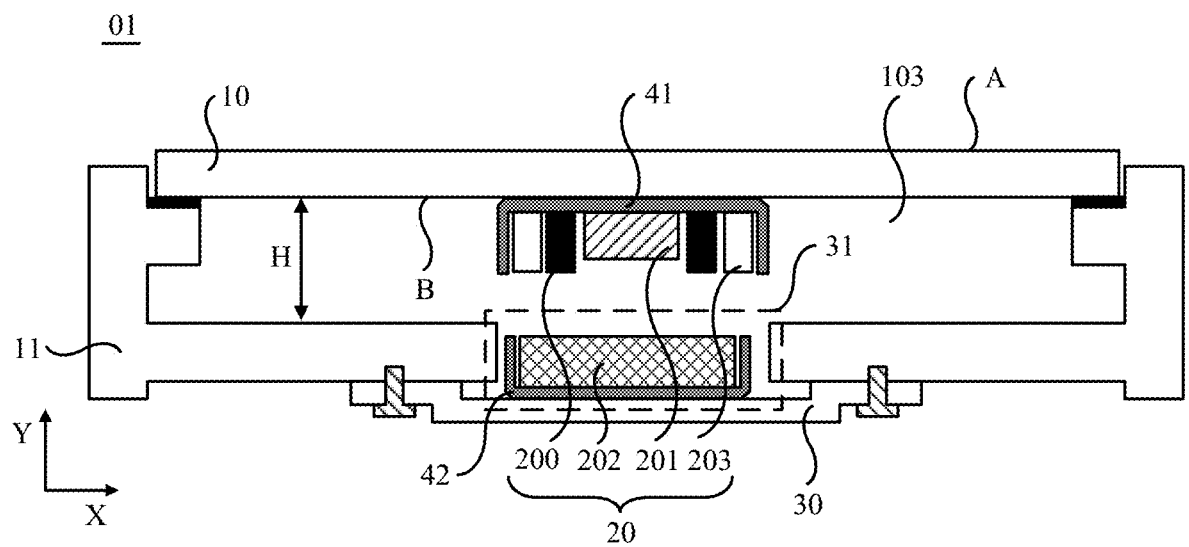
FIG. 4 is a schematic diagram of a structure of another mobile terminal including a vibrator according to an embodiment of this application.

In addition, to connect the first magnet 201, the coil 200, and the third magnet 203 to the rear face B of the display module 10, as shown in FIG. 4, the mobile terminal 01 further includes a first magnetic insulation cover 41 and a second magnetic insulation cover 42. The first magnetic insulation cover 41 may be connected to the rear face B of the display module 10 by using an adhesive. The first magnet 201, the coil 200, and the third magnet 203 are all located in the first magnetic insulation cover 41, and are all connected to an inner wall of the first magnetic insulation cover 41 through binding by using an adhesive. The first magnetic insulation cover 41 may be in a U shape, so that bottom surfaces (surfaces facing the display module 10) and side surfaces (surfaces perpendicular to the display module 10) of the first magnet 201, the coil 200, and the third magnet 203 can be wrapped. To improve reliability of the vibrator 20, the first magnet 201, the coil 200, and the third magnet 203 may be fastened by using an adhesive.

The second magnetic insulation cover 42 may be connected to the middle frame 11 by using an adhesive. The second magnet 202 is located in the second magnetic insulation cover 42, and is connected to an inner wall of the second magnetic insulation cover 42 through binding by using an adhesive. Similarly, the second magnetic insulation cover 42 may also be in a U shape, so that a bottom surface (a surface facing the bearing plate 111 of the middle frame 11) and a side surface (a surface perpendicular to the display module 10) of the second magnet 202 can be wrapped.

In addition, the first magnetic insulation cover 41 and the second magnetic insulation cover 42 may be made of a magnetic conductive material, to reduce diffusion of magnetic lines of force in a magnetic field including the first magnet 201, the second magnet 202, the coil 200, and the third magnet 203, and reduce magnetic resistance.

To dispose at least a part of the vibrator 20 in the accommodation cavity 103, as shown in FIG. 4, the mobile terminal 01 further includes a support 30. At least a part of the second magnet 202 is located in an opening 31 on the middle frame 11. The support 30 is disposed on a surface of one side that is of the middle frame 11 and that is away from the display module 10, and may be connected to the middle frame 11 through adhesive layer bonding, or by using a connecting piece such as a screw or a pin. In addition, the middle frame 11 may be provided with the opening 31, and the second magnet 202 passes through the opening 31, is disposed on the support 30, and is connected to the support 30.

In this case, the coil 200 is energized, a direction of a current flowing into the coil is alternately changed, and a magnetic field generated by the coil 200 may interact with a magnetic field generated by the second magnet 202, so that a mutually attractive or repulsive force can be generated between the coil 200 and the second magnet 202 in a direction in which the current flows. Therefore, in the direction perpendicular to the display surface A of the display module 10 (namely, the direction Y in FIG. 4), the coil 200 may drive the display module 10 to vibrate upwards and downwards.

In a process in which the coil 200 vibrates upwards and downwards in the direction Y, the coil 200 may drive the display module 10 to vibrate upwards and downwards in a same direction. Therefore, in a sound making system that mainly includes the vibrator 20 and the display module 10, the display module 10 is used as a diaphragm, and in a vibration process, air is pushed to produce a sound, to make a sound on screen. In this case, the sound making system can perform a function of an earpiece or a speaker, to play an audio signal. Therefore, there is no need to punch a hole or install an earpiece on a front face of the mobile terminal 01, to increase a screen-to-body ratio of the mobile terminal 01.

In addition, a magnetization direction of the second magnet 202 is opposite to a magnetization direction of the first magnet 201, so that a repulsive force can be generated between the second magnet 202 and the first magnet 201, the coil 200 vibrates more easily, and strength of a magnetic field inside the vibrator 20 is increased.

It should be noted that any magnet in this embodiment of this application may be a permanent magnet. The magnet has a first pole, for example, an N pole (or an S pole), and a second pole, for example, an S pole (or an N pole). A setting manner of the first pole and the second pole of the magnet is not limited in this application. A magnetization direction of the magnet is a direction in which a magnetic line of force inside the magnet points from the S pole to the N pole.

Figure 5A:
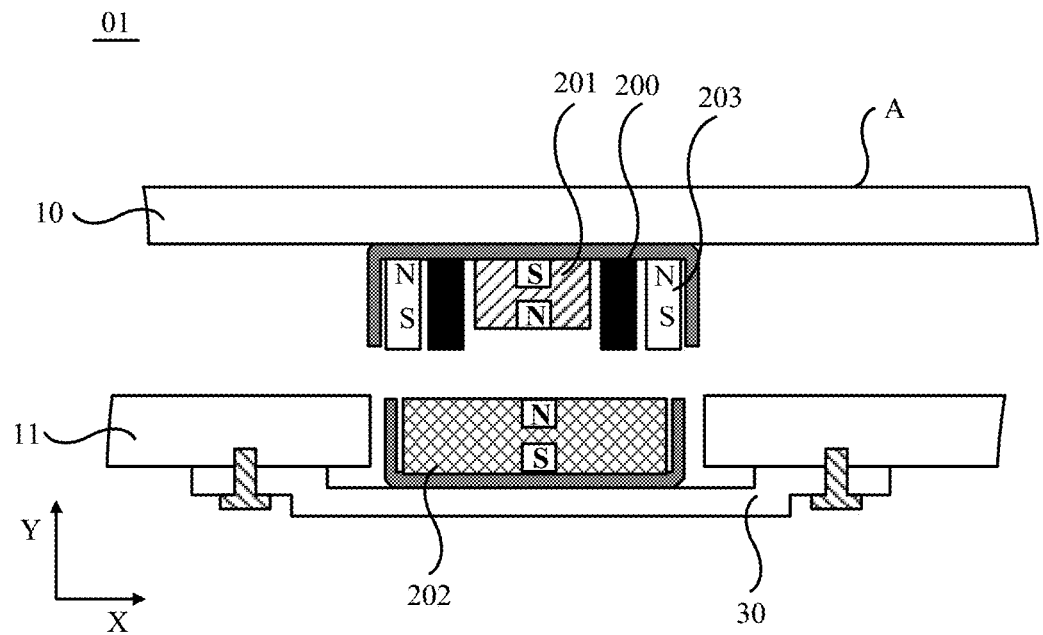
FIG. 5a is a schematic diagram of a structure of another mobile terminal including a vibrator according to an embodiment of this application.

For ease of description, in some embodiments of this application, the following provides descriptions by using an example in which a first pole of a magnet shown in FIG. 5a is an N pole and a second pole is an S pole.

Based on this, in order that the magnetization direction of the second magnet 202 is opposite to the magnetization direction of the first magnet 201, a pole of the first magnet 201 and a pole of the second magnet 202 need to be opposite. For example, as shown in FIG. 5a, a first pole (for example, an N pole) of the first magnet 201 faces downwards (away from the display module 10), and a second pole (for example, an S pole) faces upwards (close to the display module 10). A first pole (for example, an N pole) of the second magnet 202 faces upwards, and a second pole (for example, an S pole) faces downwards.

In addition, in this embodiment provided in this application, to further increase a driving force provided by the vibrator 20 to the display module 10, the vibrator 20 further includes a third magnet 203 shown in FIG. 5a. The third magnet 203 is located on one side that is of the coil 200 and that is away from the first magnet 201. A second pole (for example, an S pole) of the third magnet 203 is close to the first pole (for example, the N pole) of the first magnet 201 and the first pole (for example, the N pole) of the second magnet 202.

For example, in this example, as shown in FIG. 5a, a magnetization direction of the third magnet 203 is perpendicular to the display surface A of the display module 10. The second pole (for example, the S pole) of the third magnet 203 faces downwards (away from the display module 10), and therefore, can be close to the first pole (for example, the N pole) of the first magnet 201 and the first pole (for example, the N pole) of the second magnet 202. In addition, the first pole (for example, the N pole) of the third magnet 203 faces upwards (close to the display module 10).

It can be learned from the foregoing that the magnetization direction of the second magnet 202 is opposite to the magnetization direction of the first magnet 201. Therefore, as shown in FIG. 5a, the first pole (for example, the N pole) of the first magnet 201 is close to the first pole (for example, the N pole) of the second magnet 202. In addition, the second pole (for example, the S pole) of the third magnet 203 is close to the first pole (for example, the N pole) of the first magnet 201 and the first pole (for example, the N pole) of the second magnet 202. Therefore, the first pole (for example, the N pole) of the first magnet 201, the first pole (for example, the N pole) of the second magnet 202, and the second pole (for example, the S pole) of the third magnet 203 are close to each other.

Figure 5B:
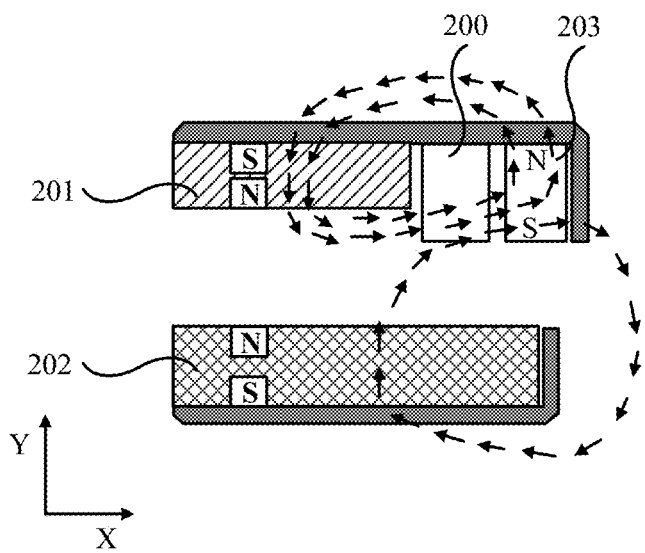

A magnetic line of force generated by the magnet goes from the S pole to the N pole inside the magnet, and goes from the N pole to a nearest S pole outside the magnet, to close the magnetic line of force. When the first pole (for example, the N pole) of the first magnet 201, the first pole (for example, the N pole) of the second magnet 202, and the second pole (for example, the S pole) of the third magnet 203 are close to each other, as shown in FIG. 5b, a magnetic line of force (shown by small black arrows in the figure) goes from the second pole (for example, the S pole) of the second magnet 202 to the first pole (the N pole) inside the second magnet 202. In addition, the second pole (for example, the S pole) of the third magnet 203 is closer to the first pole (for example, the N pole) of the second magnet 202 than the second pole (for example, the S pole) of the second magnet 202 outside the second magnet 202. Therefore, outside the second magnet 202, after passing through the coil 200 from the first pole (for example, the N pole) of the second magnet 202, the magnetic line of force enters the nearest second pole (for example, the S pole) of the third magnet 203.

In addition, it can be learned from the foregoing that the third magnet 203 is disposed on the side that is of the coil 200 and that is away from the first magnet 201, and the third magnet 203 and the coil 200 are disposed in parallel. Therefore, outside the second magnet 202, after departing from the first pole (for example, the N pole) of the second magnet 202, the magnetic line of force enters the coil 200 in a direction approximating to a horizontal direction X (parallel to a horizontal plane A of the display module 10), exits through the coil 200 from a surface that is of the coil 200 and that is close to the third magnet 203, and enters the second pole (for example, the S pole) of the third magnet 203 that is horizontal to the coil 200.

In addition, in some embodiments of this application, as shown in FIG. 5a, the coil 200 protrudes from the first magnet 201 on one side close to the middle frame 11 in the direction (the direction Y) perpendicular to the display surface A of the display module 10. Therefore, a surface (a left side) that is of the coil and that is close to the first magnet 201 is not blocked by the first magnet 201.

Based on this, similarly, as shown in FIG. 5b, a magnetic line of force goes from the second pole (for example, the S pole) of the first magnet 201 to the first pole (the N pole) inside the first magnet 201. Then, because the surface (the left side) that is of the coil and that is close to the first magnet 201 is not blocked by the first magnet 201, outside the first magnet 201, after departing from the first pole (for example, the N pole) of the first magnet 201, the magnetic line of force enters, in a direction approximating to the horizontal direction X (parallel to the horizontal plane A of the display module 10), the coil 200 from the surface that is of the coil 200, that is close to the first magnet 201, and that is not blocked by the first magnet 201, exits from the surface that is of the coil 200 and that is close to the third magnet 203, and enters the second pole (for example, the S pole) of the third magnet 203 that is horizontal to the coil 200. In this case, the magnetic line of force may pass through the coil 200 from the surface that is of the coil 200 and that is close to the first magnet 201 and the surface that is of the coil 200 and that is close to the third magnet 203. Therefore, the magnetic line of force inside the coil 200 may approximate to the horizontal direction X.

Figure 6A:
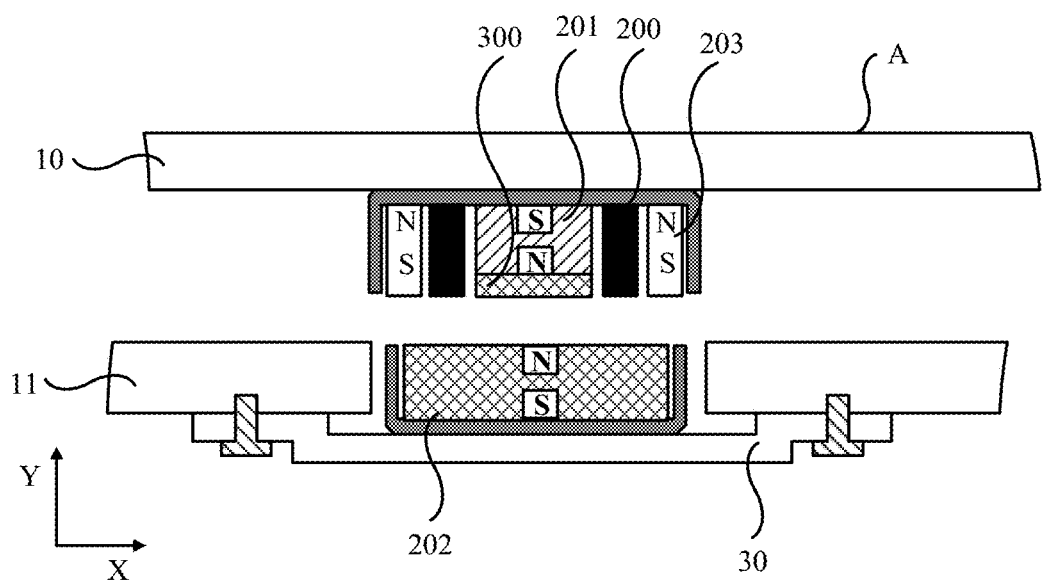
FIG. 6a is a schematic diagram of a structure of another mobile terminal including a vibrator according to an embodiment of this application.

Alternatively, in some other embodiments of this application, as shown in FIG. 6*a*, the vibrator 20 may further include a magnetic conductive sheet 300. The magnetic conductive sheet 300 is disposed on a surface of one side on which the first pole (for example, the N pole) of the first magnet 201 is located. A magnetic conduction direction of the magnetic conductive sheet 300 is parallel to the display surface A (the horizontal direction X) of the display module 10.

Figure 6B:
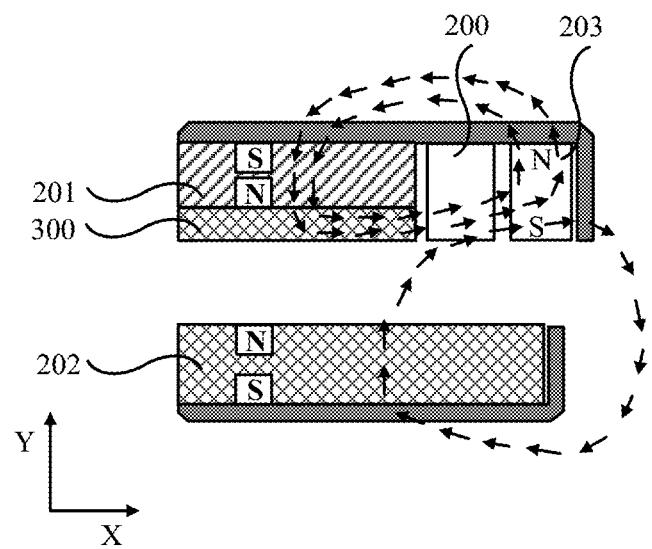

In this case, as shown in FIG. 6*b*, a magnetic line of force goes from the second pole (for example, the S pole) of the first magnet 201 to the first pole (N pole) inside the first magnet 201. Then, outside the first magnet 201, after departing from the first pole (for example, the N pole) of the first magnet 201, under a magnetic conduction action of the magnetic conductive sheet 300, the magnetic line of force (shown by small black arrows in the figure) enters, in a direction approximating to the horizontal direction X (parallel to the horizontal plane A of the display module 10), the coil 200 from the surface that is of the coil 200 and that is close to the first magnet 201, exits from the surface that is of the coil 200 and that is close to the third magnet 203, and enters the second pole (for example, the S pole) of the third magnet 203 that is horizontal to the coil 200. In this case, the magnetic line of force may pass through the coil 200 from the surface that is of the coil 200 and that is close to the first magnet 201 and the surface that is of the coil 200 and that is close to the third magnet 203. Therefore, the magnetic line of force inside the coil 200 may approximate to the horizontal direction X.

It should be noted that a material constituting the magnetic conductive sheet 300 may be a magnetic conductive metal material. In addition, a dimension of the magnetic conductive sheet 300 in the direction X is far greater than a dimension of the magnetic conductive sheet 300 in a thickness direction (namely, the direction Y), so that the magnetic conduction direction of the magnetic conductive sheet 300 is parallel to the display surface A (the horizontal direction X) of the display module 10.

Figure 6C:
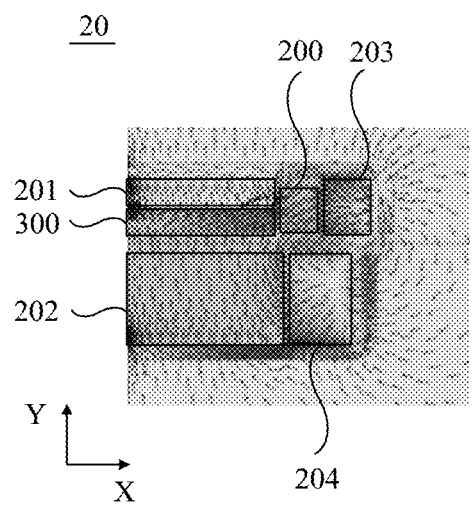

Therefore, a third magnet 203 located outside the coil 200 is added to the vibrator 20, and the magnetization direction of the third magnet 203 is set, in other words, the first pole (for example, the N pole) of the first magnet 201, the first pole (for example, the N pole) of the second magnet 202, and the second pole (for example, the S pole) of the third magnet 203 are close to each other, to forcibly specify a path and a direction of a magnetic line of force in space in which a magnet is located. Therefore, as shown in FIG. 6*c*, directions of most of magnetic lines of force (black arrows in the figure) entering the coil 200 approximate to the horizontal direction X.

A component that is in the horizontal direction X and that is of the magnetic lines of force entering the coil 200 can drive the coil 200 to vibrate in a vertical direction Y (the direction perpendicular to the display surface of the display module 10) in the magnetic field. Therefore, when the directions of most of the magnetic lines of force 200 entering the coil 200 approximate to the horizontal direction X, the component that is in the horizontal direction X and that is of the magnetic lines of force entering the coil 200 increases. Therefore, a driving force that is of the coil 200 and that is used to drive the display module 10 to vibrate in the vertical direction Y can be increased. Therefore, when the vibrator 20 provided in this embodiment of this application is used to drive the display module 10 to make a sound on screen, a quantity of turns of the coil 200 may be appropriately reduced when the driving force provided by the vibrator 20 remains unchanged, to reduce impedance of the coil 200. Therefore, when a sound on screen is made on a high frequency band, a current on the coil does not decrease due to an increase in the impedance, to effectively resolve a problem that a high frequency volume of the mobile terminal 01 is insufficient.

In addition, because the component that is in the horizontal direction X and that is of the magnetic lines of force entering the coil 200 increases, a component that is in the vertical direction Y and that is of the magnetic lines of force entering the coil 200 decreases. Therefore, a vibration amplitude of the coil 200 in the horizontal direction X can be reduced, and a shear force between the coil 200 and the display module 10 can be reduced. Further, when the coil 200 and the display module 10 are bound and fastened by using an adhesive layer, a problem that degumming of the coil 200 occurs due to the shear force in the vibration process, and consequently, product reliability is reduced may be avoided.

If a manufacturing process permits, a thickness (a dimension in the direction X) of the third magnet 203 may be as small as possible, for example, may be approximately 0.5 mm or 1 mm. In addition, in order to not affect a force between the first magnet 201 and the second magnet 202, the thickness of the third magnet 203 may not exceed a half of a dimension of the first magnet 201 in the direction X.

Figure 7A:
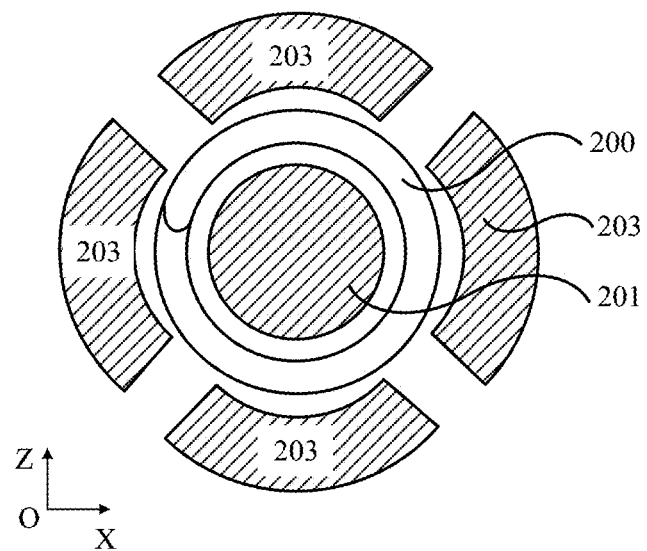

It should be noted that, a quantity of disposed third magnets 203 is not limited in this application. For example, in some embodiments, the vibrator 20 may be provided with one third magnet 203. Alternatively, as shown in FIG. 7*a*, in some embodiments of this application, the vibrator 20 may include a plurality of third magnets 203 distributed around the coil 200. Two adjacent third magnets 203 may be connected by using an adhesive layer.

Based on this, to facilitate installation of the third magnet 203, as shown in FIG. 7*a*, a cross section (an XOZ plane) of the third magnet 203 is in a fan shape. A radian of a surface of one side that is of the third magnet 203 and that is close to the coil 200 coincides with a radian of an outer surface (namely, the surface close to the third magnet 203) of the coil 200. Therefore, component space inside the vibrator 20 is increased, and dimension interference between adjacent components is reduced. In addition, when the third magnet 203 and the coil 200 are bound by using an adhesive, the third magnet 203 and the coil 200 can be bound more closely.

Figure 7B:
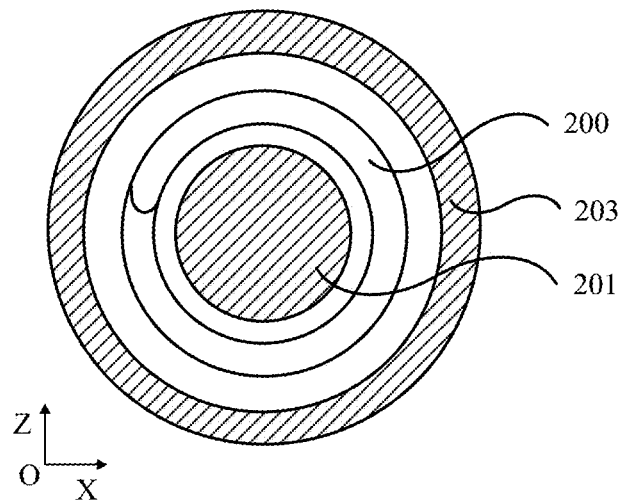

Alternatively, in some other embodiments of this application, as shown in FIG. 7*b*, a cross section (an XOZ plane) of the third magnet 203 is in an annular shape. Both the coil 200 and the first magnet 201 are located in the annular shape. Similarly, to facilitate installation of the third magnet 203, a radian of a surface of one side that is of the third magnet 203 and that is close to the coil 200 coincides with a radian of an outer surface of the coil 200.

It should be noted that the cross section (the XOZ plane) of the third magnet 203 is parallel to the display surface A of the display module 10.

Figure 8:
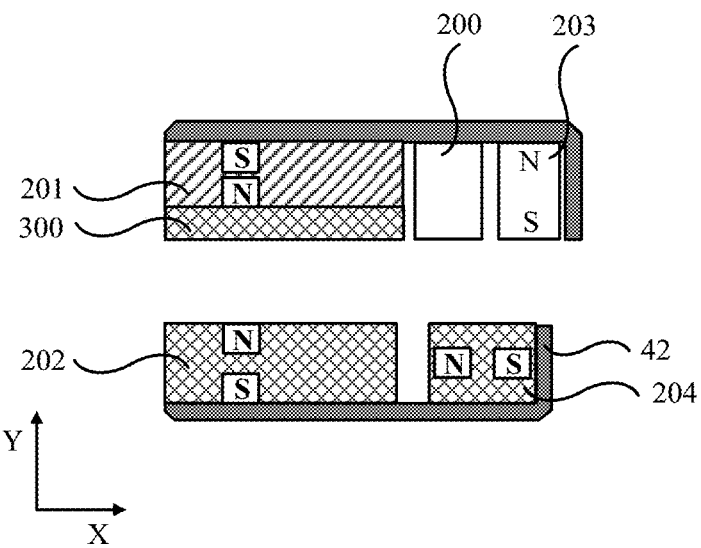
FIG. 8 is a schematic diagram of a structure of the vibrator in FIG. 4.

In addition, the vibrator 20 may further include at least one fourth magnet 204 shown in FIG. 8. When the vibrator 20 includes the second magnetic insulation cover 42, the fourth magnet 204 may be located in the second magnetic insulation cover 42, and is connected to the inner wall of the second magnetic insulation cover 42 through binding by using an adhesive. In addition, to further improve the reliability of the vibrator 20, the fourth magnet 204 may also be bound to the second magnet 202 by using an adhesive.

A magnetization direction of the fourth magnet 204 is parallel to the display surface A of the display module 10 and faces an inside of the vibrator 20. For example, an S pole of the fourth magnet 204 is away from the second magnet 202, and an N pole of the fourth magnet 204 is close to the second magnet 202. In this case, a magnetic line of force points from the S pole of the fourth magnet 204 to the second magnet 202 inside the fourth magnet 204. In other words, the magnetization direction (the S pole points to the N pole) of the fourth magnet 204 faces the inside of the vibrator 20. Therefore, strength of a magnetic field inside the vibrator 20 may be further increased, and a quantity of magnetic lines of force entering the coil 200 in FIG. 6c can be further increased, to increase the driving force applied by the coil 200 to the display module.

If a manufacturing process permits, a thickness (a dimension in the direction X) of the fourth magnet 204 may be as small as possible, for example, may be approximately 0.5 mm or 1 mm. In addition, in order to not affect a force between the first magnet 201 and the second magnet 202, the thickness of the fourth magnet 204 may not exceed a half of a dimension of the second magnet 202 in the direction X.

Figure 9A:
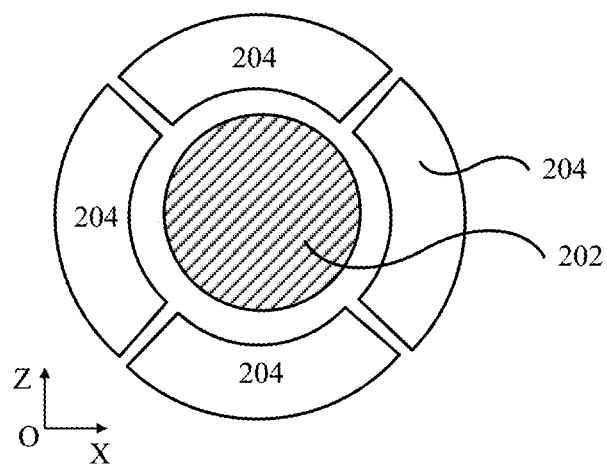
FIG. 9a is a schematic diagram of a structure of a fourth magnet in FIG. 8.

It should be noted that, a quantity of disposed fourth magnets 204 is not limited in this application. For example, in some embodiments, the vibrator 20 may be provided with one fourth magnet 204. Alternatively, as shown in FIG. 9a, in some embodiments of this application, the vibrator 20 may include a plurality of fourth magnets 204 distributed around the second magnet 202. Two adjacent fourth magnets 204 may be connected by using an adhesive layer.

When a cross section of the second magnet 202 is in a circular shape, to facilitate installation of the fourth magnet 204 and reduce a probability of dimension interference between components in the vibrator 20, as shown in FIG. 9a, a cross section of the fourth magnet 204 may be in a fan shape. A radian of a surface of one side that is of the fourth magnet 204 and that is close to the second magnet 202 coincides with a radian of a surface of one side that is of the second magnet 202 and that is close to the fourth magnet 204.

Figure 9B:
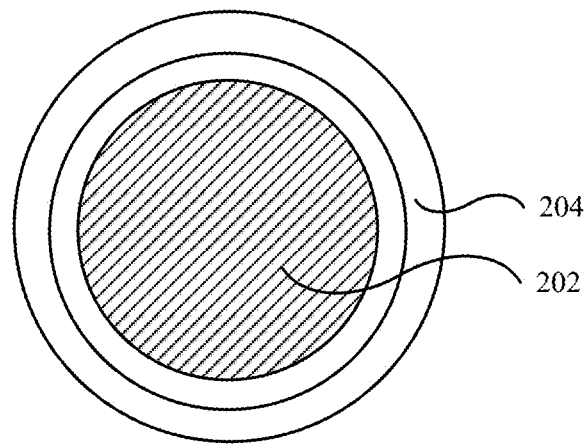
FIG. 9b is a schematic diagram of another structure of a fourth magnet in FIG. 8.

Alternatively, in some other embodiments of this application, as shown in FIG. 9b, a cross section (an XOZ plane) of the fourth magnet 204 is in an annular shape. The second magnet 202 is located in the annular shape. Similarly, to facilitate installation of the fourth magnet 204, a radian of a surface of one side that is of the fourth magnet 204 and that is close to the second magnet 202 coincides with a radian of a surface of one side that is of the second magnet 202 and that is close to the fourth magnet 204.

It should be noted that the cross section (the XOZ plane) of the fourth magnet 204 is parallel to the display surface A of the display module 10.

The foregoing provides descriptions by using an example in which the first pole of the magnet is an N pole and the second pole is an S pole. In some other embodiments of this example, the first pole of the magnet may be an S pole, and the second pole may be an N pole.

Figure 10:
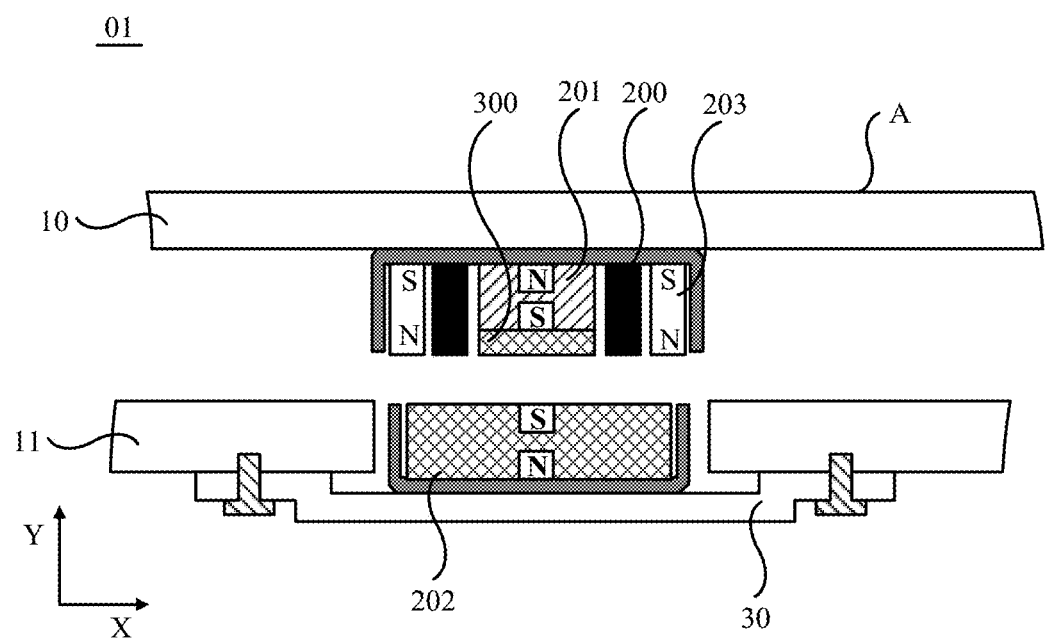
FIG. 10 is a schematic diagram of a structure of another mobile terminal including a vibrator according to an embodiment of this application.

Based on this, in order that the magnetization direction of the second magnet 202 is opposite to the magnetization direction of the first magnet 201, for example, as shown in FIG. 10, the first pole (for example, the S pole) of the first magnet 201 faces downwards, and the second pole (for example, the N pole) faces upwards. The first pole (for example, the S pole) of the second magnet 202 faces upwards, and the second pole (for example, the N pole) faces downwards. In addition, the magnetization direction of the third magnet 203 is perpendicular to the display surface A of the display module 10. The second pole (for example, the N pole) of the third magnet 203 faces downwards, and therefore, can be close to the first pole (for example, the S pole) of the first magnet 201 and the first pole (for example, the S pole) of the second magnet 202. In addition, the first pole (for example, the S pole) of the third magnet 203 faces upwards.

Figure 11:
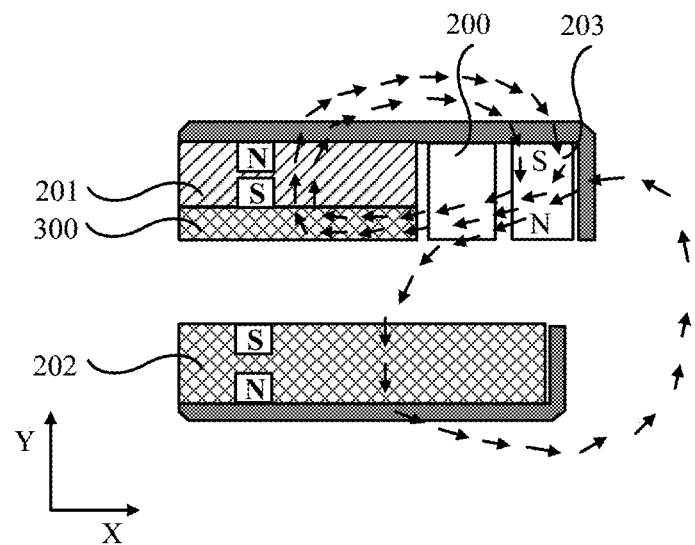
FIG. 11 is a schematic diagram of a magnetic field distribution of the vibrator in FIG. 10.

Similarly, when the first pole (for example, the S pole) of the first magnet 201, the first pole (for example, the S pole) of the second magnet 202, and the second pole (for example, the N pole) of the third magnet 203 are close to each other, as shown in FIG. 11, a magnetic line of force (shown by small black arrows in the figure) goes from the first pole (for example, the S pole) of the second magnet 202 to the second pole (N pole) inside the second magnet 202. In addition, the first pole (for example, the S pole) of the third magnet 203 is closer to the second pole (for example, the N pole) of the second magnet 202 than the first pole (for example, the S pole) of the second magnet 202 outside the second magnet 202. Therefore, outside the second magnet 202, after departing from the second pole (for example, the N pole) of the second magnet 202, the magnetic line of force first enters the nearest second pole (for example, the S pole) of the third magnet 203. Then, the magnetic line of force passes through the coil 200, and then enters the first pole (for example, the S pole) of the second magnet 202.

In addition, outside the first magnet 201, a magnetic line of force departs from the second pole (for example, the N pole) of the first magnet 201, and enters the first pole (for example, the S pole) of the third magnet 203. The third magnet 203 and the coil 200 are disposed in parallel. Therefore, the magnetic line of force departs from the second pole (for example, the N pole) of the third magnet 203, enters, under a magnetic conduction action of the magnetic conductive sheet 300 in a direction approximating to the horizontal direction X (parallel to the horizontal plane A of the display module 10), the coil 200 from a surface that is of the coil 200 and that is close to the third magnet 203, exits through the coil 200 from a surface that is of the coil 200 and that is close to the first magnet 201, and enters the first pole (for example, the S pole) of the second magnet 202 through the magnetic conductive sheet 300.

Therefore, the third magnet 203 located outside the coil 200 is added to the vibrator 20, and the magnetization direction of the third magnet 203 is set, in other words, the first pole (for example, the S pole) of the first magnet 201, the first pole (for example, the S pole) of the second magnet 202, and the second pole (for example, the N pole) of the third magnet 203 are close to each other, to forcibly specify a path and a direction of a magnetic line of force in space in which a magnet is located. Therefore, as shown in FIG. 11, the directions of most of the magnetic lines of force 200 entering the coil 200 approximate to the horizontal direction X. The driving force that is of the coil 200 and that is used to drive the display module 10 to vibrate in the vertical direction Y is increased, and the shear force between the coil 200 and the display module 10 is reduced.

Example 2

This example is the same as Example 1. As shown in FIG. 3a, at least a part of the vibrator 20 may be disposed in the accommodation cavity 103. The vibrator 20 includes a first magnet 201, a second magnet 202, a coil 200, and at least one third magnet 203. The first magnet 201, the coil 200, and the third magnet 203 may be disposed in a first magnetic insulation cover 41. The third magnet 203 is disposed in a second magnetic insulation cover 42. In addition, the vibrator 20 may further include a fourth magnet 204 disposed in the second magnetic insulation cover 42.

Figure 12A:
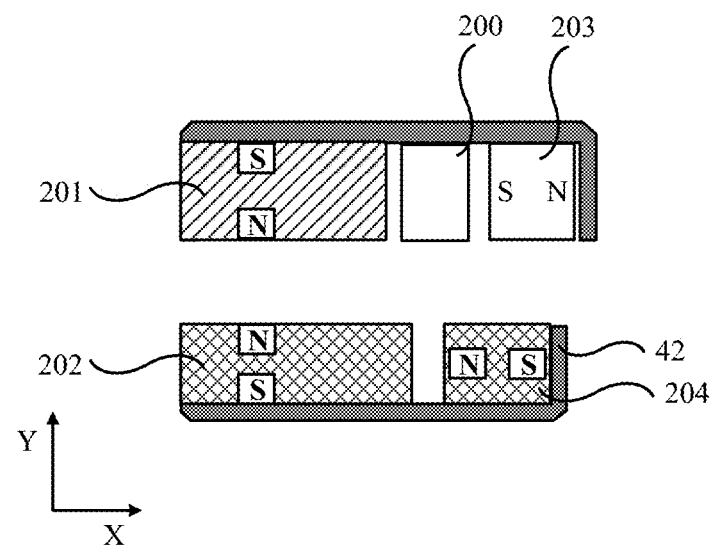
FIG. 12a is a schematic diagram of another structure of the vibrator in FIG. 4.

A difference between Example 2 and Example 1 lies in that, as shown in FIG. 12a, a magnetization direction of the third magnet 203 is parallel to the display surface A of the display module 10.

For ease of description, in some embodiments of this application, the following provides descriptions by using a structure in FIG. 12a as an example and by using an example in which a first pole of a magnet is an N pole and a second pole is an S pole. Based on this, in order that a magnetization direction of the second magnet 202 is opposite to a magnetization direction of the first magnet 201, a first pole (for example, an S pole) of the first magnet 201 faces downwards, and a second pole (for example, an N pole) faces upwards. A first pole (for example, an N pole) of the second magnet 202 faces upwards, and a second pole (for example, an S pole) faces downwards.

When the first pole (for example, the N pole) of the first magnet 201, the first pole (for example, the N pole) of the second magnet 202, and a second pole (for example, an S pole) of the third magnet 203 are close to each other, and the magnetization direction of the third magnet 203 is parallel to the display surface A of the display module 10, as shown in FIG. 12a, a first pole (for example, an N pole) of the third magnet 203 is away from the first magnet 201, and the second pole (for example, the S pole) of the third magnet 203 is close to the first magnet 201.

Figure 12B:
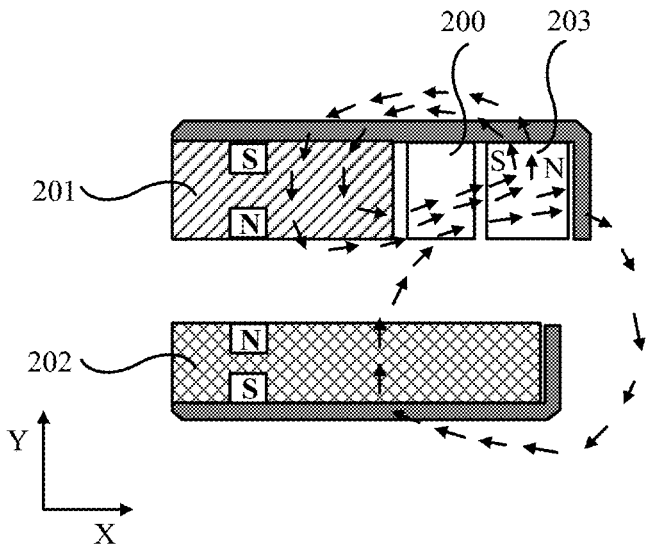

Based on this, as shown in FIG. 12b, a magnetic line of force (shown by small black arrows in the figure) goes from the second pole (for example, the S pole) of the second magnet 202 to the first pole (the N pole) inside the second magnet 202. In addition, the second pole (for example, the S pole) of the third magnet 203 is closer to the first pole (for example, the N pole) of the second magnet 202 than the second pole (for example, the S pole) of the second magnet 202 outside the second magnet 202. Therefore, outside the second magnet 202, after departing from the first pole (for example, the N pole) of the second magnet 202 and passing through the coil 200, the magnetic line of force enters the nearest second pole (for example, the S pole) of the third magnet 203, exits from the first pole (for example, the N pole) of the third magnet 203, and enters the second pole (for example, the S pole) of the second magnet 202.

In addition, inside the first magnet 201, a magnetic line of force goes from the second pole (for example, the S pole) of the first magnet 201 to the first pole (N pole). It can be learned from the foregoing that the third magnet 203 is disposed on one side that is of the coil 200 and that is away from the first magnet 201, the third magnet 203 and the coil 200 are disposed in parallel, and the magnetization direction of the third magnet 203 is a horizontal direction X (parallel to a horizontal plane A of the display module 10). Therefore, outside the second magnet 202, after departing from the first pole (for example, the N pole) of the second magnet 202, the magnetic line of force enters, in a direction approximating to the horizontal direction X (parallel to the horizontal plane A of the display module 10), the coil 200 from a surface that is of the coil 200 and that is close to the first magnet 201, exits through the coil 200 from the surface that is of the coil 200 and that is close to the third magnet 203, and enters the second pole (for example, the S pole) of the third magnet 203 that is horizontal to the coil 200. Next, the magnetic line of force exits from the first pole (for example, the N pole) of the third magnet 203, and enters the second pole (for example, the S pole) of the first magnet 201.

Figure 12C:
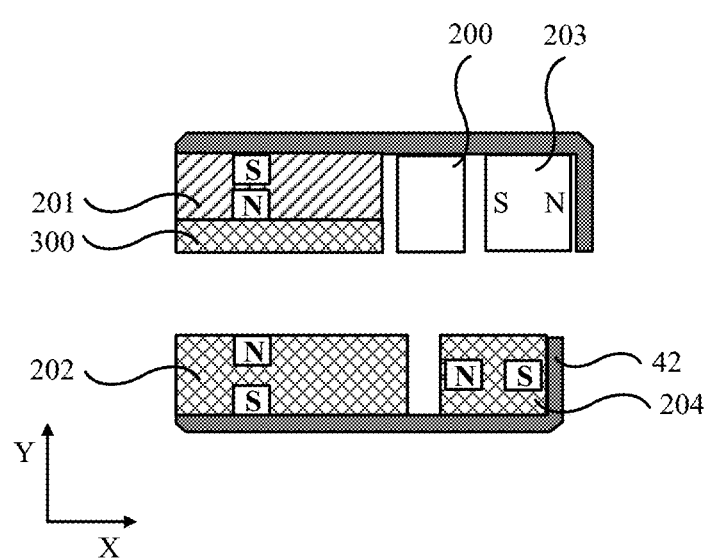
FIG. 12c is a schematic diagram of another structure of the vibrator in FIG. 4.
Figure 12D:
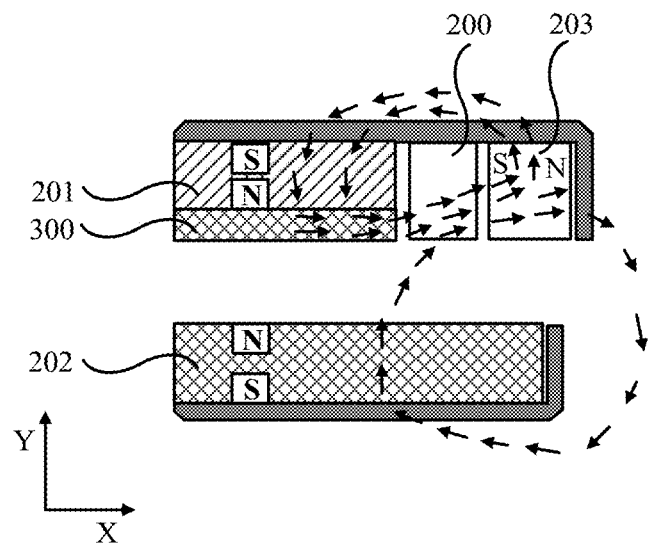
FIG. 12d is a schematic diagram of a magnetic field distribution of the vibrator in FIG. 12c.

Alternatively, in some other embodiments of this application, the vibrator 20 may further include a magnetic conductive sheet 300 shown in FIG. 12c. A disposing manner of the magnetic conductive sheet 300 is the same as that described above. As shown in FIG. 12d, a magnetic conduction direction of the magnetic conductive sheet 300 is the horizontal direction X (parallel to the horizontal plane A of the display module 10). Therefore, under a magnetic conduction action of the magnetic conductive sheet 300, after entering the magnetic conductive sheet 300, each magnetic line of force (shown by small black arrows in the figure) departing from the first pole (for example, the N pole) of the first magnet 201 may basically enter the coil 200 in the horizontal direction X from a surface that is the coil 200 and that is close to the first magnet 201, exit from a surface that is of the coil 200 and that is close to the third magnet 203, and enter the second pole (for example, the S pole) of the third magnet 203 that is horizontal to the coil 200. Next, the magnetic line of force exits from the first pole (for example, the N pole) of the third magnet 203, and enters the second pole (for example, the S pole) of the first magnet 201. Therefore, a quantity of magnetic lines in the horizontal direction in the coil 200 can be increased. A driving force that is of the coil 200 and that is used to drive the display module 10 to vibrate in a vertical direction Y is increased, and a shear force between the coil 200 and the display module 10 is reduced.

The foregoing provides descriptions by using an example in which the first pole of the magnet is an N pole and the second pole is an S pole. In some other embodiments of this example, the first pole of the magnet may be an S pole, and the second pole may be an N pole.

Figure 13A:
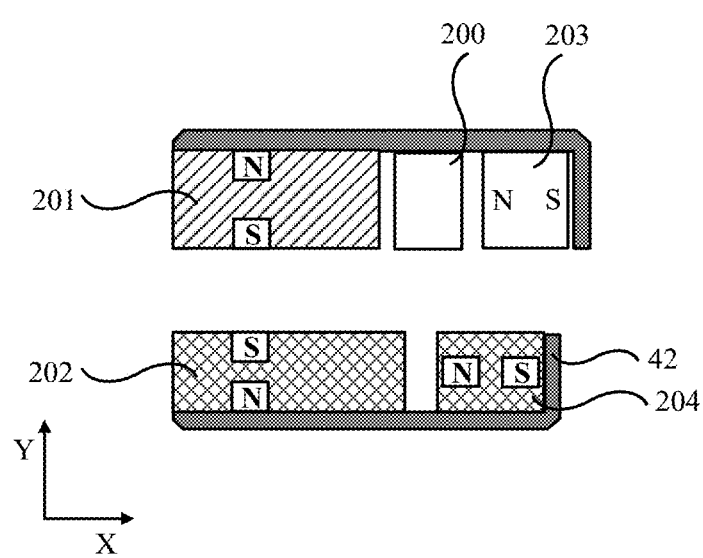
FIG. 13a is a schematic diagram of another structure of the vibrator in FIG. 4.

Based on this, in order that the magnetization direction of the second magnet 202 is opposite to the magnetization direction of the first magnet 201, for example, as shown in FIG. 13a, the first pole (for example, the S pole) of the first magnet 201 faces downwards, and the second pole (for example, the N pole) faces upwards. The first pole (for example, the S pole) of the second magnet 202 faces upwards, and the second pole (for example, the N pole) faces downwards. In addition, the magnetization direction of the third magnet 203 is parallel to the display surface A of the display module 10. As shown in FIG. 13a, the first pole (for example, the S pole) of the third magnet 203 is away from the first magnet 201, and the second pole (for example, the N pole) of the third magnet 203 is close to the first magnet 201.

Figure 13B:
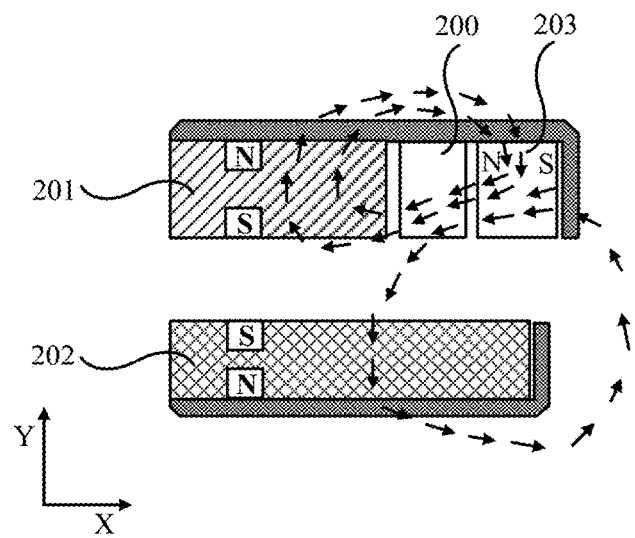

Similarly, in this case, as shown in FIG. 13b, a magnetic line of force (shown by small black arrows in the figure) goes from the first pole (for example, the S pole) of the second magnet 202 to the second pole (N pole) inside the second magnet 202. In addition, the first pole (for example, the S pole) of the third magnet 203 is closer to the second pole (for example, the N pole) of the second magnet 202 than the first pole (for example, the S pole) of the second magnet 202 outside the second magnet 202. Therefore, outside the second magnet 202, after departing from the second pole (for example, the N pole) of the second magnet 202, the magnetic line of force first enters the nearest second pole (for example, the S pole) of the third magnet 203. Then, the magnetic line of force passes through the coil 200, and then enters the first pole (for example, the S pole) of the second magnet 202.

A magnetic line of force goes from the first pole (for example, the S pole) of the third magnet 203 to the second pole (the N pole) in the horizontal direction X (parallel to the horizontal plane A of the display module 10) inside the third magnet 203. It can be learned from the foregoing that the third magnet 203 and the coil 200 are disposed in parallel. Therefore, outside the third magnet 203, after departing from the second pole (for example, the N pole) of the third magnet 203, the magnetic line of force enters, in a direction approximating to the horizontal direction X (parallel to the horizontal plane A of the display module 10), the coil 200 from the surface that is of the coil 200 and that is close to the third magnet 203, and exits through the coil 200 from the surface that is of the coil 200 and that is close to the first magnet 201. Next, the magnetic line of force enters the first pole (for example, the S pole) of the first magnet 201. Then, outside the first magnet 201, the magnetic line of force exits from the second pole (for example, the N pole) of the first magnet 201, and enters the first pole (for example, the S pole) of the third magnet 203.

Similarly, a third magnet 203 located outside the coil 200 is added to the vibrator 20, and the magnetization direction of the third magnet 203 is set, to forcibly specify a path and a direction of a magnetic line of force in space in which a magnet is located. Therefore, as shown in FIG. 13b, directions of most of magnetic lines of force 200 entering the coil 200 approximate to the horizontal direction X.

It should be noted that, in this example, a disposing manner of the fourth magnet 204 is the same as that described above. Details are not described herein again. In addition, FIG. 13b is described by using an example in which the vibrator 20 does not include the magnetic conductive sheet 300. In some other embodiments of this application, the vibrator 20 may further include a magnetic conductive sheet 300 located on one side that is of the first magnet 201 and that is close to the second magnet 202. A magnetic conduction direction of the magnetic conductive sheet 300 is parallel to the horizontal plane A of the display module 10. Therefore, under a magnetic conduction action of the magnetic conductive sheet 300, a magnetic line of force starting from the second pole (for example, the N pole) of the third magnet 203 may enter the coil 200 from the surface that is of the coil 200 and that is close to the third magnet 203, exist from the surface that is of the coil 200 and that is close to the first magnet 201, pass through the magnetic conductive sheet 300, and then enter the first pole (for example, the S pole) of the first magnet 201.

Figure 14:
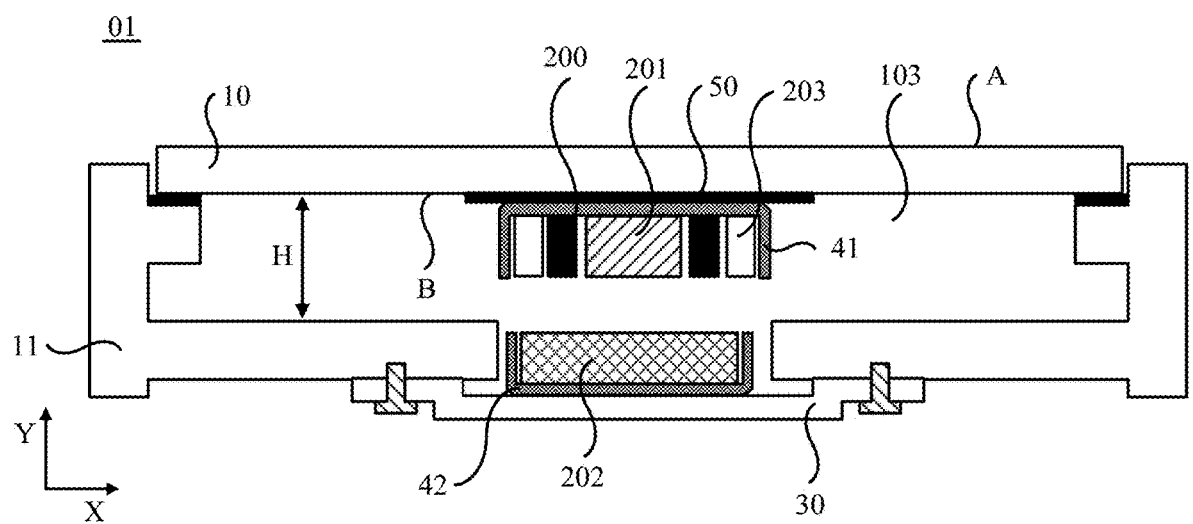
FIG. 14 is a schematic diagram of a structure of another mobile terminal including a vibrator according to an embodiment of this application.

For any one of the foregoing examples, as shown in FIG. 14, the mobile terminal may further include a support sheet 50. An upper surface of the support sheet 50 is connected to the display module 10. A lower surface of the support sheet 50 is connected to the first magnetic insulation cover 41. An area of the upper surface of the support sheet 50 is greater than an area of a surface of one side that is of the first magnetic insulation cover 41 and that is close to the support sheet 50.

Therefore, a contact area between the support sheet 50 and the display module 10 is large because the support sheet 50 is of a sheet structure. Therefore, the upper surface and the lower surface of the support sheet 50 are respectively in contact with the display module 10 and the vibrator 20, to increase a contact area between the vibrator 20 and the display module 10, so that the driving force provided by the vibrator 20 to the display module 10 in a vibration process can be applied to the display module 10 more evenly. In addition, the support sheet 50 may be used to further enlarge an area of a deformation region of the display module 10, increase efficiency of driving, by the vibrator 20, the display module 10 to vibrate, reduce power consumption, and improve an effect of making a sound on screen.

It should be noted that a material constituting the support sheet 50 may be a metal material or another material having a hard texture.

Figure 15:
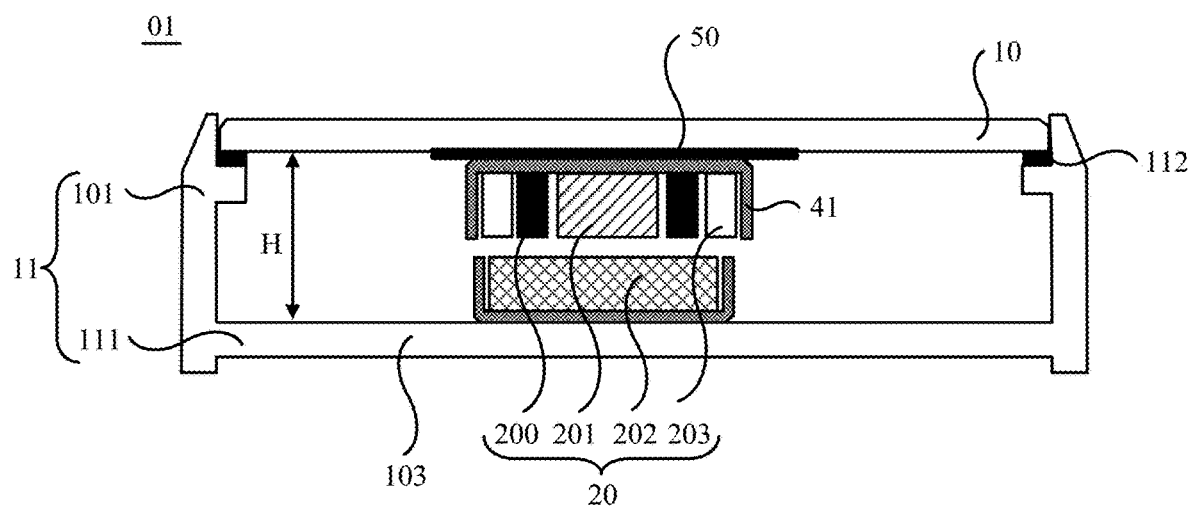
FIG. 15 is a schematic diagram of a structure of another mobile terminal including a vibrator according to an embodiment of this application.

The foregoing provides descriptions by using an example in which at least a part of the vibrator 20 is disposed in the accommodation cavity 103 between the middle frame 11 and the display module 10. In some other embodiments of this application, as shown in FIG. 15, when the gap H between the bearing plate 111 of the middle frame 11 and the rear face B of the display module 10 is large enough, the entire vibrator 20 may be disposed in the accommodation cavity 103. A structure of the vibrator 20 is the same as that described above. Details are not described herein again.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A mobile terminal, comprising:
a middle frame;
a display connected to the middle frame, wherein an accommodation cavity is formed between the display and the middle frame; and
at least one vibrator, wherein at least a part of the vibrator is disposed inside the accommodation cavity, and in a direction perpendicular to a display surface of the display, the vibrator is configured to drive the display to vibrate upwards and downwards, wherein
the vibrator comprises a first magnet, a second magnet, a coil, and at least one third magnet; and
the first magnet, the coil, and the third magnet are all connected to a rear face of the display, the first magnet is located in a closed region enclosed by a conducting wire of the coil, the third magnet is located on one side of the coil that faces away from the first magnet, the second magnet is connected to the middle frame, a location of the second magnet and a location of the first magnet are disposed opposite each other, and a first pole of the first magnet, a first pole of the second magnet, and a second pole of the third magnet are close to each other, so that at least some magnetic lines of force pass through the coil from a surface of the coil that is close to the first magnet and a surface of the coil that is close to the third magnet.

2. The mobile terminal according to claim 1, wherein a magnetization direction of the third magnet is perpendicular to the display surface of the display, a first pole of the third magnet is close to the display, and the second pole of the third magnet is away from the display; and
the coil protrudes from the first magnet on one side close to the middle frame in the direction perpendicular to the display surface.

3. The mobile terminal according to claim 1, wherein a magnetization direction of the third magnet is parallel to the display surface; and the second pole of the third magnet is close to the first magnet, and a first pole of the third magnet is away from the first magnet.

4. The mobile terminal according to claim 2, wherein the vibrator further comprises a magnetic conductive sheet disposed on a surface of one side on which the first pole of the first magnet is located, and a magnetic conduction direction of the magnetic conductive sheet is parallel to the display surface.

5. The mobile terminal according to claim 1, wherein the vibrator comprises a plurality of third magnets distributed around the coil, the plurality of third magnets including the at least one third magnet, and two adjacent third magnets are connected by using an adhesive layer.

6. The mobile terminal according to claim 5, wherein a cross section of the third magnet comprises a fan shape, and a radian of a surface of one side of the third magnet that is close to the coil coincides with a radian of an outer surface of the coil; and the cross section is parallel to the display surface.

7. The mobile terminal according to claim 1, wherein a cross section of the third magnet comprises an annular shape, both the coil and the first magnet are located in the annular shape, and a radian of a surface of one side of the third magnet that is close to the coil coincides with a radian of an outer surface of the coil; and the cross section is parallel to the display surface.

8. The mobile terminal according to claim 1, wherein the vibrator further comprises at least one fourth magnet; and the at least one fourth magnet is connected to the middle frame, and a magnetization direction of the at least one fourth magnet is parallel to the display surface and faces an inside of the vibrator.

9. The mobile terminal according to claim 8, wherein the vibrator comprises a plurality of fourth magnets, including the at least one fourth magnet, distributed around the second magnet, and two adjacent fourth magnets are connected by using an adhesive layer.

10. The mobile terminal according to claim 9, wherein a cross section of the second magnet comprises a circular shape, a cross section of the fourth magnet comprises a fan shape, and a radian of a surface of one side of the fourth magnet that is close to the second magnet coincides with a radian of a surface of one side of the second magnet that is close to the fourth magnet; and the cross section is parallel to the display surface.

11. The mobile terminal according to claim 8, wherein a cross section of the second magnet comprises a circular shape, a cross section of the fourth magnet comprises an annular shape, the second magnet is located in the annular shape, and a radian of a surface of one side of the fourth magnet that is close to the second magnet coincides with a radian of a surface of one side of the second magnet that is close to the fourth magnet; and the cross section is parallel to the display surface.

12. The mobile terminal according to claim 1, wherein the middle frame is provided with an opening;

the mobile terminal further comprises a support, and at least a part of the second magnet is located in the opening on the middle frame;

the support is disposed on a surface of one side of the middle frame that is away from the display, and is connected to the middle frame; and the second magnet passes through the opening and is disposed on the support.

13. The mobile terminal according to claim 1, further comprising:

a first magnetic insulation cover connected to the rear face of the display, wherein the first magnet, the third magnet, and the coil are all located in the first magnetic insulation cover, and are all connected to an inner wall of the first magnetic insulation cover; and a second magnetic insulation cover connected to the middle frame, wherein the second magnet is located in the second magnetic insulation cover, and is connected to an inner wall of the second magnetic insulation cover.

14. The mobile terminal according to claim 13, wherein the vibrator comprises the fourth magnet, and the fourth magnet is located in the second magnetic insulation cover and is connected to the inner wall of the second magnetic insulation cover.

15. The mobile terminal according to claim 14, wherein the mobile terminal further comprises a support sheet;

an upper surface of the support sheet is connected to the display, and a lower surface of the support sheet is connected to the first magnetic insulation cover; and an area of the upper surface of the support sheet is greater than an area of a surface of one side of the first magnetic insulation cover that is close to the support sheet.

* * * * *